United States Patent [19]

Suginoya et al.

[11] Patent Number: 5,580,436

[45] Date of Patent: Dec. 3, 1996

[54] METHOD OF PRODUCING A MULTICOLOR LIQUID CRYSTAL DISPLAY DEVICE

[75] Inventors: Mitsuru Suginoya; Hitoshi Kamamori, both of Tokyo, Japan

[73] Assignee: Seiko Instruments Inc., Japan

[21] Appl. No.: 389,010

[22] Filed: Aug. 3, 1989

[30] Foreign Application Priority Data

Aug. 19, 1988 [JP] Japan .................................. 63-206901

[51] Int. Cl.⁶ .............................. G02F 1/13; C25D 13/06
[52] U.S. Cl. .......................... 205/122; 204/486; 205/317; 349/108; 349/122; 427/108; 427/162; 427/165
[58] Field of Search ............................... 204/18.1, 180.2, 204/181.1, 486, 496, 503; 205/122, 317; 359/68, 74; 427/108, 162, 164, 165

[56] References Cited

U.S. PATENT DOCUMENTS

| | | | |
|---|---|---|---|
| 4,522,691 | 6/1985 | Suginoya et al. | 204/18.1 |
| 4,617,094 | 10/1986 | Kamamori et al. | 204/18.1 |
| 4,779,957 | 10/1988 | Suginoya et al. | 350/339 R |

FOREIGN PATENT DOCUMENTS

| | | |
|---|---|---|
| 0113237 | 7/1984 | European Pat. Off. . |
| 0226218 | 6/1987 | European Pat. Off. . |
| 0238174 | 9/9187 | European Pat. Off. . |

OTHER PUBLICATIONS

Patent Abstracts of Japan, vol. 10, No. 149 (P-461) [2206], May 30, 1986, Dainippon Ink Kagaku Kogyo K.K.

Primary Examiner—Kathryn Gorgos
Assistant Examiner—William T. Leader
Attorney, Agent, or Firm—Adams & Wilks

[57] ABSTRACT

A liquid crystal optical device is comprised of a liquid crystal layer and a pair of substrates for sandwiching the liquid crystal layer to effect orientation of molecules of the liquid crystal layer. A plurality of base electrodes are disposed on an inner surface of one of the substrates. A plurality of color filter films are electrodeposited on the respective ones of the base electrodes and have different color tones. A plurality of driving electrodes are disposed on the color filter films for applying a driving voltage to the liquid crystal layer. A protective layer is interposed between the color filter films and the driving electrodes to effect buffering of thermal stress caused therebetween.

13 Claims, 1 Drawing Sheet

METHOD OF PRODUCING A MULTICOLOR LIQUID CRYSTAL DISPLAY DEVICE

BACKGROUND OF THE INVENTION

The present invention relates to a multicolor liquid crystal display device utilizing a color filter formed by electrodeposition, and relates to the method of making the multicolor liquid crystal display device having high durability while being driven by a reduced driving voltage.

FIG. 2 shows one example of the conventional multicolor liquid crystal display device utilizing an electrodeposited color filter. In FIG. 2, the device is comprised of a transparent substrate made of glass, electrodes 12 made of transparent electroconductive film patterned in a desired shape, and color filters 13 formed by electrodeposition of a composition including electrodepositable polymer and coloring material. Each section of color filter 13 is superposed in alignment with the pattern of a corresponding section of electrode 12 and colored in a different color tone. The method of making color filter has been disclosed in Japanese Patent Application No. 233933/1982, and provides an efficient process of conveniently producing color filter having high resolution.

A transparent electroconductive film 14 made of indium-tin-oxide (ITO) is formed on the filter and patterned in alignment with each section of the electrode 12. An alignment layer 15 composed of polyimide is superposed on the electroconductive film 14. A second transparent substrate 16 is formed with a second transparent electrode 17 and another alignment layer 18. A liquid crystal 10 is filled in a space sandwiched by the pair of substrates 11 and 16 to constitute a liquid crystal cell.

The liquid crystal cell is applied with a driving voltage. When observing the liquid crystal cell through a polarizer and an analyzer which sandwich therebetween the cell, a part of the liquid cell in transparent state exhibits color tone of the color filter and the other part thereof does not pass incident light to exhibit black tone. Namely, the color liquid crystal display device displays different tones of the color filter by using the liquid crystal cell as an optical shutter.

In such a multicolor liquid crystal display device, the transparent electroconductive film 14 is used as a driving electrode, the electroconductive film 14 is not covered with an insulating film such as a color filter, hence any voltage drop is not caused by such color filter and therefore the driving voltage can be reduced.

However, the multicolor liquid crystal display device shown in FIG. 2 has a problem in view of reliability or durability with respect to the strength of the boundary between the color filter and the transparent driving electroconductive layer. If external stress is concentrated at the boundary due to, for example, heat, it may cause the transparent driving electroconductive film to fail and the generation of cracks. For example, a color filter formed by electrodeposition of polyester-melamine resin has a thermal expansion coefficient on the order of about $10^{-4}$, and a transparent driving electroconductive film of ITO formed thereon has a thermal expansion coefficient on the order of about $10^{-7}$. Such a difference of thermal deformation may cause a considerable amount of stress in the boundary of the color filter and ITO film due to an external factor such as temperature variation and thereby degrade the reliability of the device.

Aside from above, there has been proposed another type of conventional multicolor liquid crystal display device disclosed, for example, in U.S. Pat. No. 4,779,957 in which a color filter is formed on a base electrode provided on a substrate, and is covered with a protective layer. An alignment layer is disposed on the protective layer so as to absorb the stress between the color filter and the alignment layer by means of the interposed protective layer.

SUMMARY OF THE INVENTION

An object of the present invention is to, therefore, improve the reliability of the transparent driving electroconductive film on the electrodeposited color filter. In the present invention, a protective layer having a buffer effect and adhesiveness to both the color filter and the transparent driving electroconductive film is formed therebetween so as to absorb stress which could be applied to the boundary portion therebetween, thereby providing the multicolor liquid crystal display device.

According to the present invention, stress caused by heat etc. is distributed to both a boundary between the color filter and the protective film, and another boundary between the protective film and the transparent driving electroconductive film, and into the protective film, thereby avoiding concentration of the stress at a particular region. Namely, deformation generated in the color filter is transmitted to the boundary of the transparent driving electroconductive film while damped within the protective film. Therefore, the stress is substantially blocked from the most delicate transparent driving electroconductive film, thereby providing a multilayer structure containing a protective or buffer layer effective to achieve high reliability.

DETAILED DESCRIPTION OF EMBODIMENTS

Hereinafter, the present invention will be described in conjunction with the drawings.

Embodiment 1

Figure 1:
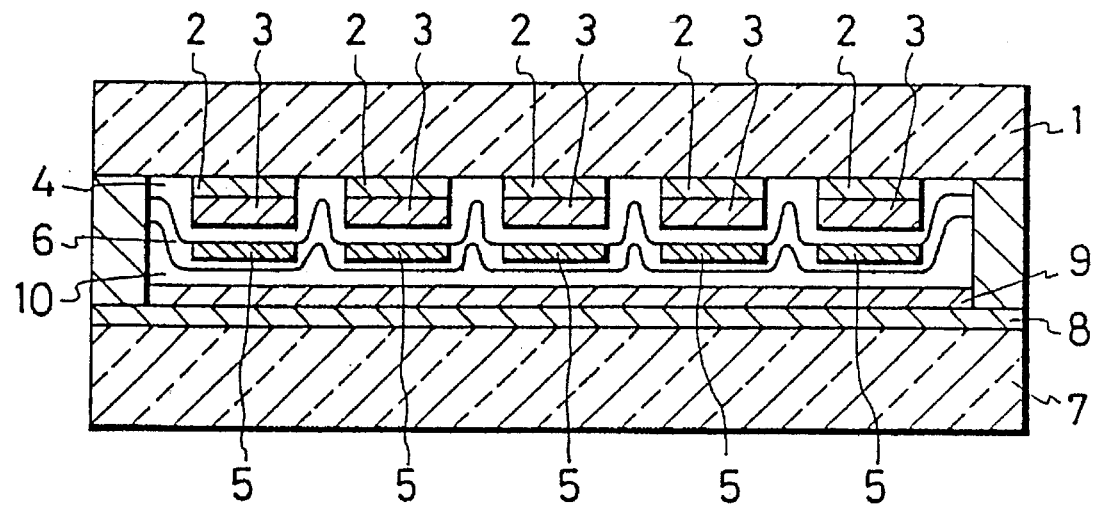
FIG. 1 is a sectional view of the multicolor display device according to the present invention.
Figure 2:
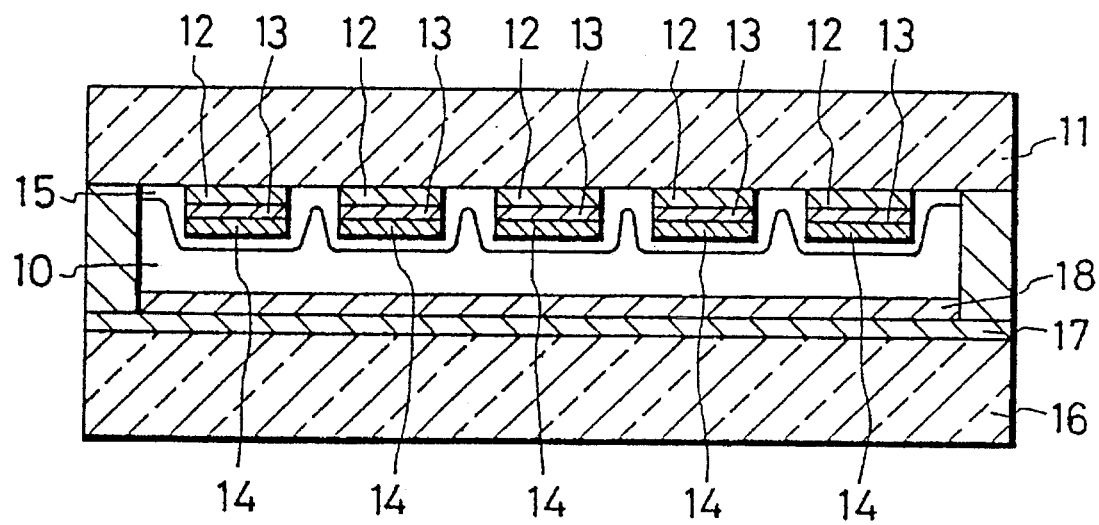
FIG. 2 is a sectional view showing the conventional mutlicolor display device applied with an electrodeposited color filter.

FIG. 1 is a sectional view showing one embodiment of the multicolor liquid crystal display device according to the present invention. The device is comprised of a substrate 1 made of glass, a plurality of ITO base electrodes 2 formed on an inner surface of the substrate, and a plurality of color filter films 3, each composed of polyester-melamine resin and coloring material of different color tone such as green, blue or red, and each electrodeposited on the corresponding base ITO electrode 2. A protective film layer 4 is disposed over the plurality of color filter films or segments 3. A solution of an epoxy-modified or an epoxy group containing acryl resin JSS-16 (produced by NIPPON SYNTHETIC GUM) is coated on the color filter films and cured at 200° C. to form the protective film layer 4. A plurality of transparent driving electrodes 5 are formed on the protective layer 4 by sputtering of ITO material while maintaining the substrate at 200° C. and by selective etching such that each driving electrode 5 is aligned to the corresponding color filter segment. By this construction, failure due to separation or cracking of the ITO driving electrodes 5 is prevented. An alignment film 6 composed of polyimide resin is coated over the driving electrodes 5, effective to align or orient liquid crystal molecules.

A counter substrate 7 is prepared by forming thereon sequentially a transparent counter driving electrode 8 and another alignment film 9. The counter substrate 7 is disposed in spaced relation to the substrate 1 to hold therebetween a liquid crystal layer 10 so as to constitute the multicolor liquid crystal display device. This multicolor liquid crystal display device maintains good display quality and high reliability after 1000 hours of driving under 80° C.

The transparent driving electrodes 5 may be disposed such that each driving electrode is at a right angle to the color filter films 3. In this case, a plurality of transparent counter driving electrodes 8 are disposed on the counter substrate such that each counter driving electrode is aligned to the corresponding color filter segment.

Embodiment 2

In this embodiment, a protective film 4 is formed by coating a coating liquid JHR-3034 (produced by NIPPON SYNTHETIC GUM) containing silicon resin compound and by curing the coating at 200° C. The same effect of buffering is obtained as in the embodiment 1.

Comparison Example

In contrast to the multilayer structure of the FIG. 1 multicolor liquid crystal display device, a protective layer is eliminated while constructing the comparison example. In this case, while forming the ITO driving electrodes directly on the color filter films, failure due to separation or cracking of the ITO electrodes results due to possible thermal stress. The obtained comparison example display device is of low quality and has poor reliability.

As described above in detail, according to the present invention, the multicolor display device is provided with a protective layer formed on color filters, and transparent electroconductive films are superposed on the protective layer effective to buffer the thermal deformation of the color filters so as to reduce the concentration of thermal stress caused by use of the color filters to thereby considerably improve the reliability or durability of an alignment layer and driving electrodes on the color filters. Moreover, the total reliability of display device can be improved while utilizing the electrodeposited color filters and while reducing a driving voltage applied to the multicolor display device.

What is claimed is:

1. A method of making a multicolor liquid crystal display device utilizing color filter segments, comprising the steps of:

forming a plurality of electroconductive films insulated from one another on a substrate;

carrying out selective electrodeposition on the electroconductive films sequentially within solutions containing dispersed electrodepositable polymer and coloring materials to form color filter segments on the respective electroconductive films; and superposing on the respective color filter segments sequentially a thermosetting protective layer and a transparent electroconductive layer so that the thermosetting protective layer is effective to absorb stress between the color filter segments and the transparent electroconductive layers to prevent cracking and peeling of the electroconductive layer; and wherein the thermosetting protective layer is formed by coating the color filter segments with polymer material containing a silicon compound and/or an epoxy group containing acryl resin, and curing the coated polymer material by heating.

2. A method according to claim 1; wherein the thermosetting protective layer is composed of polymer material containing an epoxy group containing acryl resin.

3. A method according to claim 2; wherein the thermosetting protective layer is composed of polymer material containing silicon compound.

4. A method of making a multicolor liquid crystal display device, comprising the steps of: forming a plurality of electrodes electrically insulated from one another on a substrate; forming a color filter film on each electrode; forming a stress-absorbing protective film layer covering each color filter film, the stress-absorbing protective film layer being composed of polymer material containing a silicon compound and/or an epoxy group containing acryl resin; and forming transparent driving electrodes on the protective film layer in alignment with respective ones of the color filter films so that stresses that may arise due to a difference in properties between the color filter films and the driving electrodes are effectively absorbed by the stress-absorbing protective film layer to thereby prvent cracking and peeling of the transparent driving electrodes.

5. A method of making a multicolor liquid crystal display device according to claim 4; wherein the step of forming a stress-absorbing protective film layer includes curing the protective film layer by heating.

6. A method of making a multicolor liquid crystal display device according to claim 4; wherein the stress-absorbing protective film layer is composed of polymer material containing silicon compound.

7. A method of making a multicolor liquid crystal display device according to claim 4; wherein the step of forming a color filter film on each electrode comprises electrodepositing a color filter film on each electrode from a solution containing electrodepositable polymer and coloring material.

8. A method of making a multicolor liquid crystal display device according to claim 4; wherein the transparent driving electrodes are comprised of indium-tin-oxide.

9. A method of making a multicolor liquid crystal display device, comprising the steps of: forming a plurality of electrodes electrically insulated from one another on a substrate; forming a color filter film having a thermal expansion coefficient on the order of $10^{-4}$ on each electrode; forming a stress-absorbing protective film layer covering each color filter film, the stress-absorbing protective film layer being composed of polymer material containing a silicon compound and/or an epoxy group containing acryl resin; and forming transparent driving electrodes having a thermal expansion coefficient on the order of $10^{-7}$ on the protective film layer in alignment with respective ones of the color filter films so that thermal stresses that may arise due to the different thermal expansion coefficients of the color filter films and the driving electrodes are effectively absorbed by the stress-absorbing protective film layer to thereby prevent cracking and peeling of the driving electrodes.

10. A method of making a multicolor liquid crystal display device according to claim 9; wherein the step of forming a stress-absorbing protective film layer includes curing the protective film layer by heating.

11. A method of making a multicolor liquid crystal display device according to claim 9; wherein the stress-absorbing protective film layer is composed of polymer material containing silicon compound.

12. A method of making a multicolor liquid crystal display device according to claim 9; wherein the step of forming a color filter film on each electrode comprises electrodepositing a color filter film on each electrode from a solution containing electrodepositable polymer and coloring material.

13. A method of making a multicolor liquid crystal display device according to claim 9; wherein the transparent driving electrodes are comprised of indium-tin-oxide.

\* \* \* \* \*